April 26, 1960   H. E. ZAHN   2,934,585
STORAGE BATTERIES
Filed Dec. 19, 1957   2 Sheets-Sheet 1
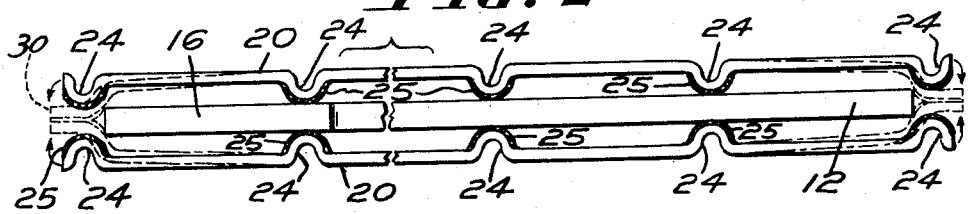
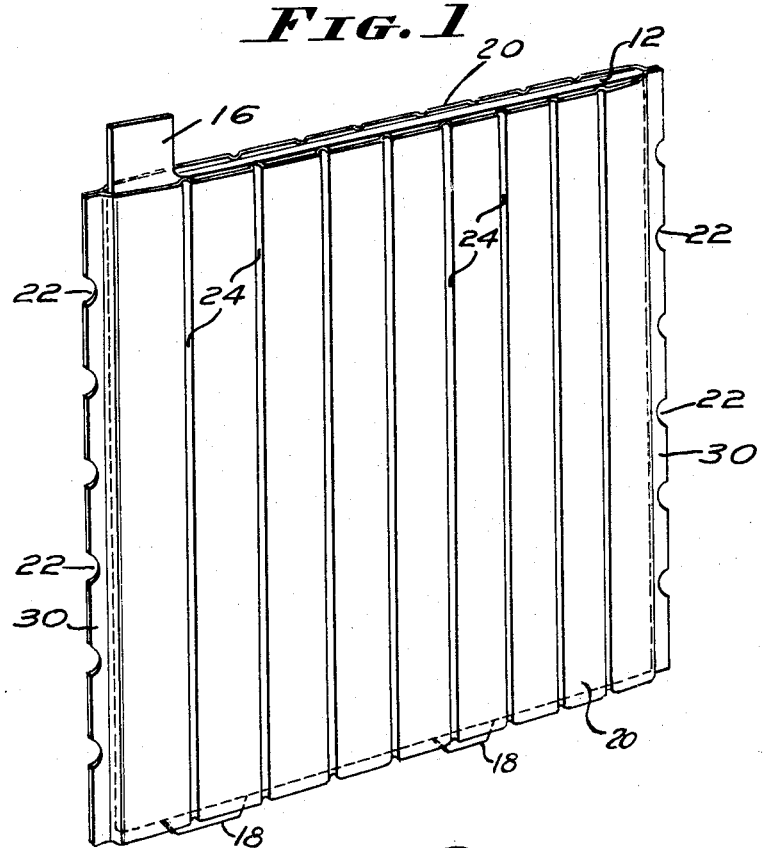
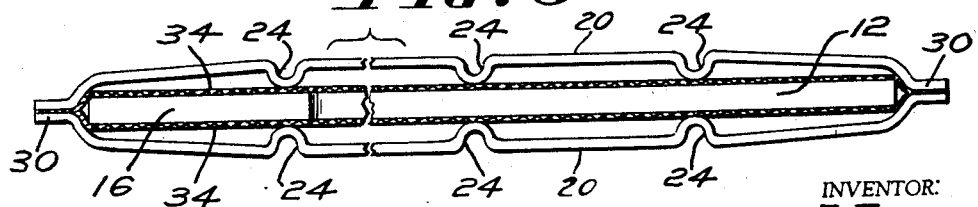
INVENTOR:
HAROLD E. ZAHN
BY:
Beau, Brooke, Buckley & Beau,
ATTORNEYS.

April 26, 1960  H. E. ZAHN  2,934,585
STORAGE BATTERIES
Filed Dec. 19, 1957  2 Sheets-Sheet 2

INVENTOR:
HAROLD E. ZAHN
BY:
Beau, Brooks, Buckley & Beau,
ATTORNEYS.

2,934,585
STORAGE BATTERIES

Harold E. Zahn, Buffalo, N.Y., assignor to Gould-National Batteries, Inc., St. Paul, Minn.

Application December 19, 1957, Serial No. 703,863

2 Claims. (Cl. 136—147)

This invention relates to secondary batteries, and more particularly to insulative envelopes for battery electrodes, such as are adapted to function as separators between adjacent electrodes of opposite polarity.

It is an object of the present invention to provide an improved separator fabrication as aforesaid, employment whereof facilitates proper relative assembly of the battery electrode and separator components.

Another object is to provide an improved separator as aforesaid which is adapted to more positively insulate adjacent electrodes from and to minimize from another dislodgment of active paste materials from the electrodes.

Another object is to provide an improved separator fabrication as aforesaid which effectively encloses the side edges of the battery electrodes, thereby precluding short-circuiting bridgments therearound by active paste material, from one electrode to another.

Another object of the invention is to provide an improved separator means as aforesaid which functions automatically to accurately locate and stabilize each electrode positionally at its proper location in the cell casing, thereby facilitating the battery assembly operation.

Another object is to provide an improved separator means as aforesaid which obviates need for plate support "bridge" devices such as are conventionally employed to provide sediment accumulation spaces.

Another object is to provide an electrode separator means as aforesaid which includes improved provision for cell electrolyte circulation.

Other objects and advantages of the invention will appear from the specification hereinafter which illustrates and describes in detail preferred examplifications of the invention, and wherein:

Fig. 1 is a perspective view of one example of a storage battery plate and separator unit of the present invention;

Fig. 2 is a top plan view of the fabrication of Fig. 1 at an intermediate stage of its assembly;

Fig. 3 is a plan view of the unit subsequent to completion of its assembly;

Figure 4:
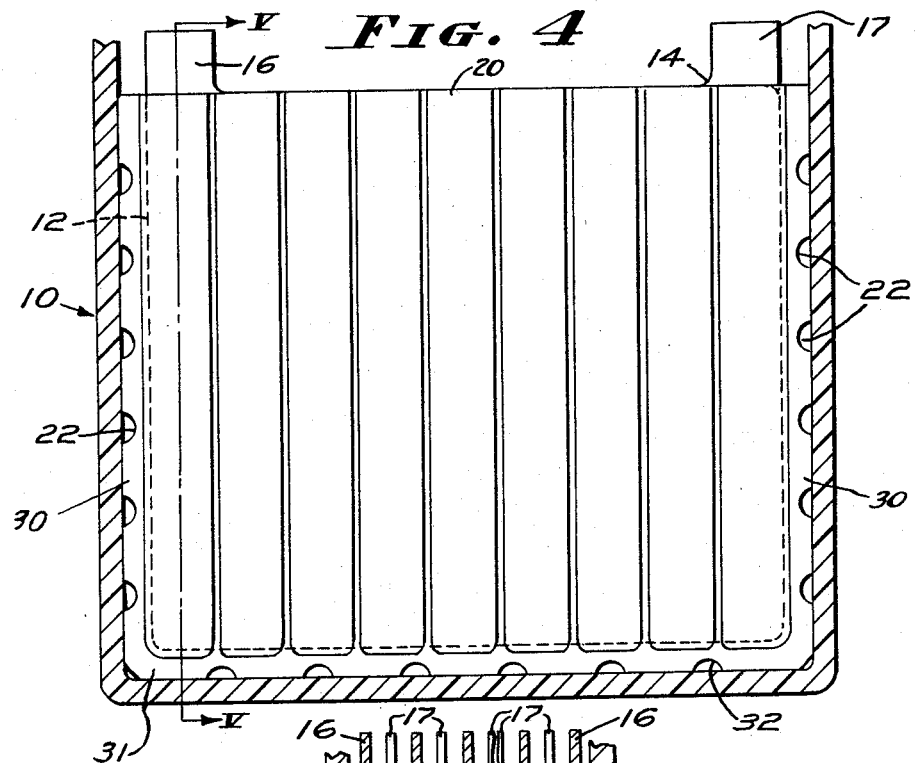
Fig. 4 is a sectional view through a cell casing showing therein in side elevation a somewhat modified form of electrode-separator unit of the present invention.

The invention is illustrated herein in conjunction with a typical rectangular form storage battery construction comprising a casing 10 (Figs. 4, 5) into which are slip-fitted in vertically standing manner a pack of electrode-separator units of the present invention; alternate electrodes of which are of opposite polarities. Thus, as shown in the drawing the positive plates are designated 12 while the negative plates are indicated at 14. Connection lugs 16, 17 extend from the plates 12, 14 for electrical connection purposes, as is conventional. As shown in Fig. 1, the plates 12 may include support feet 18—18.

The separator fabrications of the present invention may be formed of any suitable electrically insulative microporous material such as will be resistant to the cell electrolyte; and thus may comprise a rubber or cellulose or synthetic plastic or agglomerated powder formulation or the like, as may be preferred. The separator stock material is conveniently provided initially in flat sheet form, cut into rectangular pieces 20 which are shaped and dimensioned generally similar to the side elevational forms of the electrodes 12; but as shown in Figs. 1–3, the separator stock pieces are cut slightly oversize in width so as to extend beyond the opposite side edges of the electrodes. As a convenience, coincident with the process of blanking out the separator stock pieces 20 they are notched as indicated at 22 (Fig. 1) along their vertical edge portions to subsequently provide for free circulation of the cell electrolyte around the edges of the plate pack as will be explained hereinafter.

The separator stock pieces 20 are then ribbed in their vertical directions as indicated at 24 to provide internal ridges adapted to hold the major body portions thereof away from the plates 12. The ribbing process may be conveniently performed by rolling or pressing a die thereagainst, and may be conducted coincident the blank cutting out and notch forming operations referred to hereinabove. The internal surfaces of the ridge portions 24 are then coated with plastic layers 25 covering the areas of their contacts with the electrodes 12, whereby the electrode-contacting portions are insulated chemically from the active paste material of the plates 12. Similar plastic layers 25 are applied interiorly of the end ribs 24 at opposite sides of the unit, and are then utilized to bond together the side edges of the separator blanks, as by subsequently heat-pressing the curved edge portions (Fig. 2) together into the flat adhesively locked-together form illustrated at 30 in Figs. 1, 3.

Thus, the double thickness edge portions 30 of the separator envelope are structurally reinforced and are thereby provided of improved stiffness form; and because they are dimensioned to accurately fit the interior of the cell they are thereby adapted to firmly hold the enclosed plate in its intended position within the cell. Hence, it will be appreciated that by virtue of the present invention unitized battery plate and separator envelope components may be fabricated as subassemblies in large numbers preparatory to slip-fitting them in alternately stacked relation with negative plates in a storage battery casing, with improved facility. The plate feet portions 18 support the plates 12 vertically while the side edge portions 30—30 of the separator devices accurately conform to the interior width dimensions of the casing 10, thereby automatically locating and stabilizing the enclosed plates 12 in proper position and attitude within the casing. The notches 22 permit circulation of electrolyte around the side edges of the plates per se without detracting from this plate locating and stabilizing function of the envelope.

Figure 5:
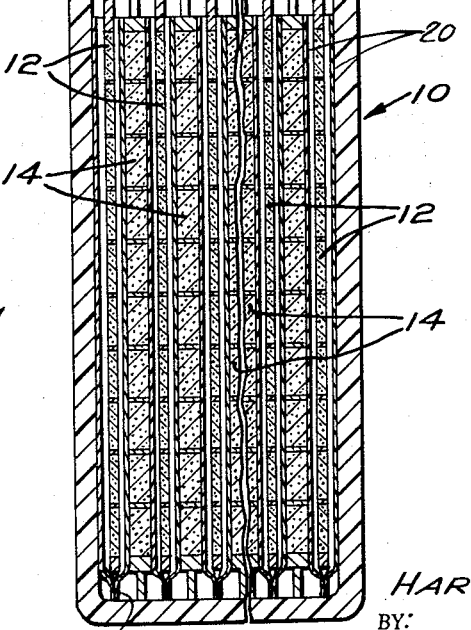
Fig. 5 is a fragmentary sectional view taken along line V—V of Fig. 4.

As illustrated in Figs. 4, 5, the envelope structure may also be fabricated to be closed along its bottom edge by means of a heat-sealed flange portion 31 corresponding to the opposite side flange portions 30—30 referred to hereinabove. The bottom flange 31 may be notched as indicated at 32 (Fig. 4) in the manner of the notchings, 22. Thus, when the pasted plates 12 are slip-fitted into the separator envelopes as subassembly units, the units are then ready for slip-fitted insertion into the cell casings with minimum expert attention, and are automatically guided by the flange portions 30, 31 into accurate plate locating positions; both vertically and laterally, as well as angularly within the casing. As indicated at 34—34 (Fig. 3) glass fibre mats or the like may be employed between the pasted plate 16 and the separator panels 20—20, if preferred.

Whereas Figs. 4, 5 illustrate employment of the plate-separator units of the invention in a cell casing without use of the usual sediment "bridge" device, it will be understood that such a bridge may be readily employed if desired in conjunction with the components shown in Figs. 4, 5; the notches 32 contributing in any event to electrolyte circulation. Whereas the separator-envelopes of the present invention have been illustrated and described hereinabove in conjunction with the positive plates 12 of a storage battery construciton, it will be appreciated that the features thereof may be usefully employed in conjunction with negative electrodes, and in batteries other than the storage battery type. Thus, although only a few forms of the invention have been shown and described in detail, it will be apparent to those skilled in the art that the invention is not so limited but that various changes may be made therein without departing from the spirit of the invention or the scope of the appended claims.

I claim:

1. In a battery, a casing having a substantially smooth interior of uniform dimensions, a battery plate and separator subassembly fitted within said casing, said subassembly comprising a generally rectangular pasted plate, a separator envelope enclosing said plate and including a pair of insulative panels sandwiching said plate therebetween and extending beyond the side and bottom edges of the plate, the portions of said panels which extend beyond the side and bottom edges of the plate being heat sealed together to form imperforate reinforcing flanges therearound, said panel and flange portions being dimensioned to accurately complement the corresponding interior dimensions of said casing and engaging said interior of the casing along the side and bottom edges of said flange portions to position and hold the subassembly fixedly within the casing, said flanges being interrupted at intervals to permit the passage of electrolyte past such flanges and freely within the casing.

2. In a battery as set forth in claim 1 wherein there are a plurality of plate and separator subassemblies fitted within said casing in contiguous relationship with each other, the panels of said separator envelope being provided with vertical depressions extending between the upper and lower edges thereof to provide channels for receiving electrolyte between the contiguous plate and separator subassemblies.

References Cited in the file of this patent

UNITED STATES PATENTS

| | | |
|---|---|---|
| 761,345 | Willard | May 31, 1904 |
| 1,012,908 | Peterson et al. | Dec. 26, 1911 |
| 1,990,976 | Booss | Feb. 12, 1935 |
| 2,157,629 | Rolph | May 9, 1939 |
| 2,589,681 | Dickover | Mar. 18, 1952 |
| 2,851,511 | Bikerman | Sept. 9, 1958 |